Sept. 10, 1940.
C. C. TAYLOR
BAILER
Original Filed March 16, 1935
Re. 21,565
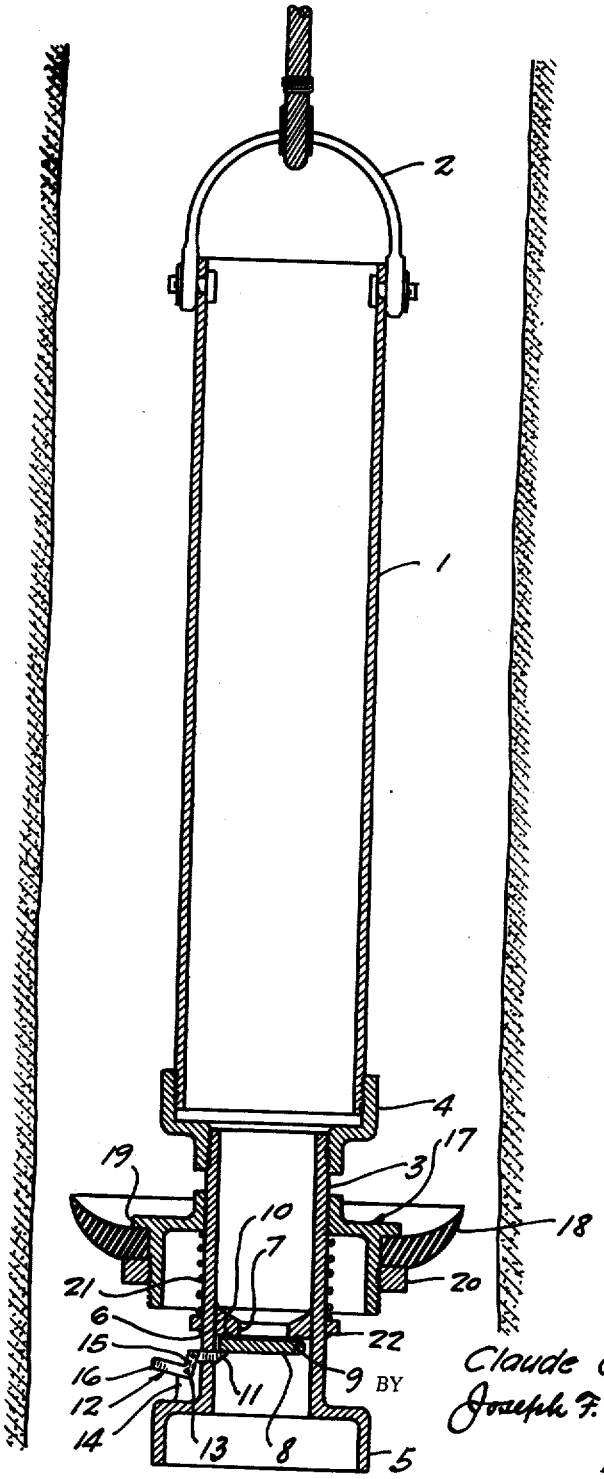
INVENTOR.
Claude C. Taylor
BY Joseph F. Westall.
ATTORNEY.

Reissued Sept. 10, 1940

Re. 21,565

UNITED STATES PATENT OFFICE 21,565

BAILER

Claude C. Taylor, Long Beach, Calif.

Original No. 2,144,669, dated January 24, 1939, Serial No. 11,446, March 16, 1935. Application for reissue June 17, 1940, Serial No. 341,018

23 Claims. (Cl. 166—19)

My invention relates generally to well bailers and specifically to bailers for lowering and discharging materials such as cement slurry, chemicals or any fluid at any level within a well.

Bailers which utilize frictional engagement with the walls of the casing as a means for opening valves are well known in the art. The present invention is characterized principally by the utilization of fluid resistance in the well as a trip-actuating force to enable discharge of the contents of the bailer at any desired point, an important advantage of which is that contents of the bailers may be so dumped in an open hole regardless of its exact size.

Frequently it is necessary to spot cement plugs at various distances from the bottom of a hole. The usual method at the present time is to run drill pipe or tubing to the desired depth and pump cement slurry down the drill pipe or tubing and follow with enough water or mud to equalize cement inside the drill pipe (or tubing) with the cement outside. The pipe or tubing is then withdrawn before the cement has had time to set. Such method, however, entails the use of expensive cementing equipment for pumping. Unless there is a very large amount of cement to be placed, it takes much longer, and due to the inaccuracies of the method, much more cement is pumped in than needed so as to make sure it is in place where desired. If cement is to be placed in a cased hole, it can be done with the form of bailer above mentioned utilizing friction with the walls of the casing on movement of the bailer upward as a means for actuating dumping mechanism, and the use of such bailer is, as above intimated, much more economical, where it can be used, than the tubing or drill pipe method referred to. In an open hole, however, variations of diameter make such frictional engagement as a means of actuating dumping mechanism impractical, while with the utilization of the principle characterizing the present invention all the advantages of positive control of dumping at any depth are preserved, whether the hole is open or cased; or when used in casing it is obvious that changes of size of the baffle or spring supporting it will not be required.

It is a principal object of my said invention to provide a practical means for utilizing resistance of the fluid in the well as a force to actuate a tripping mechanism controlling a discharge port of a bailer upon upward movement of the bailer after reaching the desired dumping position.

Another object is to provide a bailer of novel construction which may be utilized with equal efficiency in both open well holes and in casing.

A further object of my invention is the provision of a bailer in which the reduced pressure created by movement of the bailer through the well fluid can be utilized to cause a more efficacious unloading of the cement in the bailer.

Other objects and salient features of my invention, which will be obvious to those of skill in this art, are simplicity of construction, resulting in economy of manufacture and ease of operation, durability and positive control in the discharge of materials.

In the drawing the single figure illustrates a preferred embodiment of my invention in section.

Referring to the drawing in detail, 1 designates a tube open at its upper end, provided with a bail 2, for lowering into a well by rope or cable. A mandrel 3, preferably of reduced diameter is secured to the bottom of tube 1 by a reducing coupling 4, the lower end 5 of which mandrel 3 is enlarged to act as a guide and project the tripping mechanism trigger while lowering the bailer in the well hole. On the inside of the lower portion of mandrel 3 an annular valve seat 6 is provided, the port 7 being adapted for closure by an outwardly opening valve 8, hinged at 9 adjacent one side of the valve-seat 6. An annular packing ring 10, in valve seat 6, is provided to form a tight closure of said valve.

Through the wall of mandrel 3, directly below the free edge of valve 8, a hole is provided, through which pin 11 of a trip mechanism extends, and which is adapted to be withdrawn to permit opening of the valve by the gravity of the material thereabove.

12 indicates a bell crank pivoted at 13 to a convenient feather 14, its inner end 15 being pivoted to pin 11, its outer end 16 forming a trigger adapted to be depressed so as to withdraw pin 11 outwardly from its support below valve 8, to permit said valve 8 to open and to discharge by gravity the contents of the bailer, through port 7.

A trigger-actuating member 17, slidably carried, with a limited range of relative movement therewith, on the exterior of mandrel 3, is provided with a baffle 18, preferably of rubber, held in position encircling member 17, by lateral flange 19 and screw-threaded collar 20, said member 17 being adapted to be actuated in such movement relative to mandrel 3 by the resistance of the fluid in the well to the upward movement therethrough of the bailer. While baffle 18 is shown in the form of a swab-rubber it is not designed to be actuated by contact with the wall of the casing or of the hole, and, obviously might be of any form which will offer resistance when passing through fluid.

Helical spring 21 is seated upon an annular flange 22 of mandrel 3, and resiliently supports said member 17, with its baffle 18.

The valve is closed, with trip and trigger set as shown in the drawing, before the cement, chemicals or other material to be dumped by the bailer is placed therein. The bailer is then lowered into the hole or casing until the point of discharge is reached, when on a reversal of direction resistance of the fluid in the well to the passage of the swab rubber or baffle through it will tend to restrain member 17 from upward movement as the bailer is raised, causing the compression of spring 21 and the lower extension of member 17 to actuate pin 11, which in turn, being withdrawn from its support of valve 8, permits the release of said valve and the discharge of the material within the bailer. The upward movement of the baffle 18 through the well fluid, in order to accomplish the operation of the valve mechanism, entails the generation of an area of reduced pressure in the lower part of the well below the baffle. If the baffle is used in a casing, or a hole which has a diameter closely corresponding to the baffle diameter, this reduction in pressure may be very great, but even in a hole such as that shown in the figure, the reduction of pressure is considerable. Under these circumstances, the cement in the body of the bailer is forced violently out of the bailer by the pressure of the well fluid above the bailer, and the bailer is thoroughly emptied and cleaned.

While the device illustrated in the accompanying drawing is described herein as a preferred form of my invention, numerous changes may be made by those of skill in this art in proportions and arrangement of the various parts as well as in the specific forms disclosed of trip mechanism, and particularly of the means for utilizing fluid resistance to actuate a trip, all without departing from the spirit of my invention as defined in the appended claims.

What I claim and desire to cover by Letters Patent is:

1. In a bailer, a discharge port, a valve controlling said discharge port, latching mechanism adapted to detachably hold said valve in closed position, and means actuated by resistance produced by its upward passage through the fluid in which said bailer is operated to release said latching mechanism to permit the opening of said valve and the discharge of the contents of said bailer.

2. In a bailer, a discharge port, a valve controlling said port, a latching mechanism adapted to detachably hold said valve in closed position, and means adapted to resist its upward passage through fluid to cause tripping of said latching mechanism to permit the opening of said valve.

3. In a bailer, a valve controlling a discharge port, latching means adapted to detachably maintain said valve closed, tripping mechanism to release said latching means comprising a member adapted to resist its passage through fluid in which said bailer is operated to permit relative movement between the body of said bailer and said tripping mechanism, and means to resist actuation of said tripping mechanism.

4. In a dump bailer, a discharge valve, discharge valve latching means, tripping mechanism to release said discharge valve latching means, and trip operating means actuated by resistance to its upward passage through fluid in which said bailer is operated.

5. In a bailer, a bucket, a valve in the bottom of said bucket, latching mechanism for said valve, a trigger adapted to release said latching mechanism and permit said valve to open, a member longitudinally reciprocable relative to the bucket to actuate said trigger by downward movement, and a laterally-extending support for said member connected to said bucket.

6. In a bailer, a mandrel, a member encircling said mandrel adapted to be slidably moved thereon by its resistance to its passage through fluid in which it is adapted to operate, and a trigger secured to said mandrel to be actuated by movement of said member relative thereto.

7. In a bailer, a bucket, a valve below said bucket, a mandrel connected to one end of said bucket, a latching mechanism for said valve, a trigger connected to and adapted to release said latching mechanism, and a baffle slidable on said mandrel to actuate said trigger by the weight of fluid in which it is opening.

8. In a bailer, a mandrel, a member encircling said mandrel adapted to be slidably moved thereon by its resistance to its passage through fluid in which it is adapted to operate, a trigger secured to said mandrel to be actuated by movement of said member relative thereto, and resilient means to urge said member in a direction away from said trigger.

9. In a bailer, a bucket, a valve below said bucket, a mandrel connected to one end of said bucket, a latching mechanism for said valve, a trigger connected to and adapted to release said latching mechanism, a baffle slidable on said mandrel to actuate said trigger by the pressure of fluid in which it is operating, and resilient means to urge said baffle in a direction away from said trigger.

10. In a bailer, a bucket, a discharge valve in said bucket, a baffle slidably connected with said bucket adapted to move relative thereto by resistance to its passage through fluid in which the bailer is operated, and means actuated by relative movement of said baffle with respect to said bucket to permit said valve to open.

11. In a bailer, a bucket, a discharge port in said bucket, a valve controlling said port, latching mechanism for said valve, and means adapted for relative movement with respect to said bucket by resistance to its passage through fluid in which the bailer is operated to trip said latching mechanism.

12. In a bailer, a discharge valve, a mandrel, a baffle slidable on said mandrel by its resistance to its passage through fluid in which the bailer is operated, and latching mechanism for said valve adapted to be tripped by said baffle upon relative movement of said mandrel and baffle.

13. In a bailer, a bucket having a valve-controlled discharge port therein, and means comprising a resilient baffle actuated by its resistance to its passage through the fluid in which the bailer is operated to open said valve.

14. In a bailer, a bucket having a discharge port, a valve for said port, latching mechanism for said valve, and means actuated by the resistance to its downward passage through fluid in which the bailer is operated to release said latching mechanism.

15. In a bailer, a bucket having a discharge port, a valve for said port adapted to open by its gravitation with respect to said bucket, means longitudinally movable with respect to said bucket, and latching mechanism for said valve carried by said bucket normally spaced from said means normally counteracting said gravitation of said valve adapted to be released by movement of said means.

16. In a well bailer, a bucket having a discharge port therein, a valve in said port, latching mechanism to maintain said valve in a position closing said port, and weighted means to actuated said latching mechanism to release said valve by relative upward movement of said bucket.

17. In a bailer, a bucket having a port therein, a valve connected to said bucket to close said port, latching means connected to said bucket to hold said valve in closed position, means actuated by its resistance to its passsage through fluid in which the bailer is operated to release said latching means, and means to shield said last-mentioned means from the contents of said bucket.

18. In a bailer, means comprising an enclosure, a valve controlling an opening in said enclosure, a latch to engage said valve to hold the same in closed position, means extending laterally with respect to said valve and said first-mentioned means to release said latch by its resistance to its passage through the fluid in which the bailer is operated.

19. In a bailer, means comprising the walls of an enclosure, a valve controlling an opening in said enclosure, a latch extending through a hole in one of said walls to hold said valve in closed position, means slidable on said first means actuated by its resistance to its passage through fluid in which said bailer is operated to compel said latch to release said valve.

20. In a bailer, a bucket adapted to be lowered through fluid in a well hole, said bucket having a discharge port therein, a valve controlling said discharge port, latching mechanism connected to said valve adapted upon actuation to permit the discharge of the contents of said bucket, and means to actuate said latching mechanism, said means adapted for actuating by its resistance to its passage through fluid in the hole of a consistency equal to the consistency of the fluid through which the bailer is lowered.

21. In bailer, a discharge port, a valve controlling said discharge port, means operating said valve, and means creating a zone of reduced pressure upon motion of the bailer through the well fluid, said discharge port forming communication between the interior of the bailer and the region in the well where said reduced pressure is generated.

22. In a bailer, a discharge port, a valve controlling said discharge port, means operating said valve, and means creating a zone of reduced pressure upon motion of the bailer in an upward direction through the well fluid, said discharge port forming communication between the interior of the bailer and the region in the well where said reduced pressure is generated.

23. In a bailer, a discharge port, a valve controlling said discharge port, means operating said valve, and a baffle secured to said bailer and movable through the well fluid to create a reduced pressure below said baffle, said discharge port communicating with the space in the well below the baffle.

CLAUDE C. TAYLOR.

CERTIFICATE OF CORRECTION.

Reissue No. 21,565. September 10, 1940.

CLAUDE C. TAYLOR.

It is hereby certified that error appears in the printed specification of the above numbered patent requiring correction as follows: Page 2, second column, line 25, claim 7, for the word "opening" read --operating--; and that the said Letters Patent should be read with this correction therein that the same may conform to the record of the case in the Patent Office.

Signed and sealed this 12th day of November, A. D. 1940.

Henry Van Arsdale,
Acting Commissioner of Patents.

(Seal)